United States Patent
Sorin et al.

(10) Patent No.: US 6,922,495 B2
(45) Date of Patent: Jul. 26, 2005

(54) OPTICAL FIBER CLADDING WITH LOW POLARIZATION-DEPENDENT COUPLING

(75) Inventors: Wayne V. Sorin, Mountain View, CA (US); Hyo-Sang Kim, Santa Clara, CA (US); Seok-Hyun Yun, Santa Clara, CA (US)

(73) Assignee: Novera Optics, Inc., Palo Alto, CA (US)

( * ) Notice: Subject to any disclaimer, the term of this patent is extended or adjusted under 35 U.S.C. 154(b) by 312 days.

(21) Appl. No.: 10/055,108

(22) Filed: Jan. 22, 2002

(65) Prior Publication Data

US 2002/0146223 A1 Oct. 10, 2002

Related U.S. Application Data

(63) Continuation-in-part of application No. 09/944,283, filed on Aug. 30, 2001, which is a continuation-in-part of application No. 09/738,282, filed on Dec. 14, 2000, which is a continuation of application No. 09/426,060, filed on Oct. 22, 1999, now Pat. No. 6,266,462, which is a continuation-in-part of application No. 09/022,413, filed on Feb. 12, 1998, now Pat. No. 6,021,237.

(51) Int. Cl.[7] ................................................. G02B 6/00
(52) U.S. Cl. ............................ 385/11; 385/27; 385/28; 385/31; 385/123; 385/126; 385/127
(58) Field of Search ............................. 385/11, 27, 28, 385/31, 123, 38, 39, 126, 127

(56) References Cited

U.S. PATENT DOCUMENTS

| | | | |
|---|---|---|---|
| 4,298,245 A | 11/1981 | Aulich et al. | 385/11 X |
| 4,915,468 A | 4/1990 | Kim et al. | 385/28 X |
| 5,506,925 A | 4/1996 | Greene et al. | 385/129 |
| 5,704,960 A | 1/1998 | Evans et al. | 65/402 |
| 5,805,751 A * | 9/1998 | Kewitsch et al. | 385/43 |
| 5,822,487 A | 10/1998 | Evans et al. | 385/123 |
| 5,953,121 A | 9/1999 | Bohnert et al. | 356/345 |
| 6,021,237 A * | 2/2000 | Kim et al. | 385/28 |
| 6,169,830 B1 * | 1/2001 | Kewitsch et al. | 385/37 |
| 6,266,462 B1 * | 7/2001 | Kim et al. | 385/28 |
| 6,289,699 B1 * | 9/2001 | Kewitsch et al. | 65/406 |
| 6,445,851 B1 * | 9/2002 | Rakuljic et al. | 385/37 |
| 6,532,323 B2 * | 3/2003 | Kim et al. | 385/28 |
| 6,839,473 B2 | 1/2005 | Kim et al. | 385/28 |
| 2001/0046348 A1 | 11/2001 | Sarkimukka et al. | 385/24 |
| 2002/0146223 A1 * | 10/2002 | Sorin et al. | 385/123 |
| 2003/0202547 A1 * | 10/2003 | Fermann et al. | 372/6 |

FOREIGN PATENT DOCUMENTS

| | | | | |
|---|---|---|---|---|
| KR | 10-0265865 | | 1/1999 | 385/28 X |
| WO | WO03062881 A1 * | | 7/2003 | 385/28 |

OTHER PUBLICATIONS

B.Y. Kim, et al., "All–Fiber Acousto–Optic Frequency Shifter," Optics Letters, vol. 11, No. 6, pp. 389–391 (Jun. 1986).

(Continued)

Primary Examiner—Brian Healy
(74) Attorney, Agent, or Firm—Blakely, Sokoloff, Taylor & Zafman LLP

(57) ABSTRACT

This invention relates to a method of making optical fiber having low polarization dependence. Light propagating through a cladding thereof has a mode group having a first eigenmode propagating at a first speed and a second eigenmode propagating at a second speed. Manufacture of the fiber is controlled so that a difference between the first and second speeds is small. A difference between the speeds divided by the first speed is preferably less than $5 \times 10^{-7}$.

24 Claims, 21 Drawing Sheets

OTHER PUBLICATIONS

S.H. Yun, et al., "Suppression of Polarization Dependence in a Two–Mode Fiber Acousto–Optic Device," Optics Letters, vol. 21, No. 12, pp. 908–910 (Jun. 15, 1996).

Seok Hyun Yun, "All–Fiber Acousto–Optic Devices and Their Applications to Fiber Lasers," Department of Physics, Korea Advanced Institute of Science and Technology, pp. 1–117 (Jun. 13, 1997).

Kyunghwan Oh, H.S. Seo, J.K. Lee, and U.C. Paek, "Polarization dependent dispersion characteristics of high order modes in a cylindrical dual mode fiber with an arbitrary index profile," XP004152383, Optics Communication, vol. 159, pp. 139–148 (Jan. 1, 1999).

A.J. Barlow, D.N. Payne, M.R. Hadley, and R.J. Mansfield, "Production of Single–Mode Fibres with Negligible Intrinsic Birefringence and Polarisation Mode Dispersion," XP000676219, Electronics Letters, vol. 17, No. 20, pp. 725–726 (Oct. 1, 1981).

PCT Notification of Transmittal of The International Search Report or The Declaration for PCT Counterpart Application No. PCT/US03/01245 Containing International Search Report (May 26, 2003).

* cited by examiner

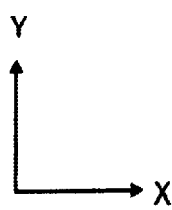
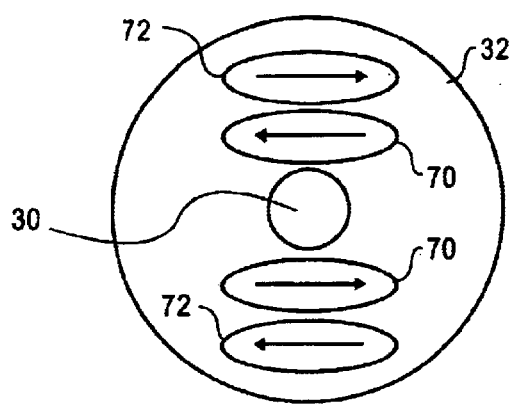
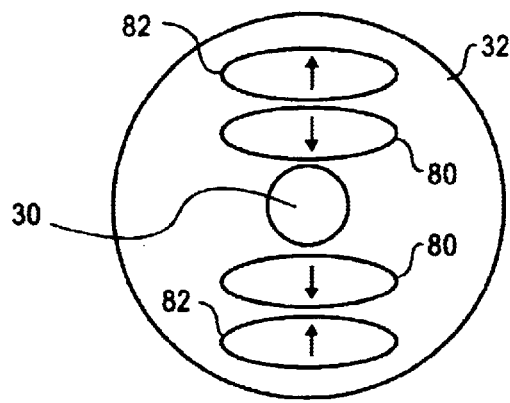
FIG. 9  FIG. 10

OPTICAL FIBER CLADDING WITH LOW POLARIZATION-DEPENDENT COUPLING

CROSS-REFERENCES TO RELATED CASES

This application is a continuation-in-part of U.S. patent application Ser. No. 09/944,283, filed on Aug. 30, 2001, now U.S. Pat. No. 6,839,473 B2, which is a continuation-in-part of U.S. patent application Ser. No. 09/738,282, filed on Dec. 14, 2000, now U.S. Pat. No. 6,532,323 B2, which is a continuation of Ser. No. 09/426,060, filed Oct. 22, 1999, now U.S. Pat. No. 6,266,462 B1, which is a continuation-in-part of Ser. No. 09/022,413, filed Feb. 12, 1998, now U.S. Pat. No. 6,021,237, which claims priority to Korean Application No. 97-24796, filed Jun. 16, 1997, now Korean Patent No. 10-0265865.

BACKGROUND OF THE INVENTION

1). Field of the Invention

This invention generally relates to a method of preparing optical fiber with low polarization dependence for use in acousto-optic applications, and, more particularly, to an acousto-optic filter employing such a fiber to reduce polarization-dependent loss (PDL) in the filter.

2). Discussion of Related Art

As an optical signal traverses an optical network, the signal is subject to losses and nonlinear effects that result in signal attenuation and distortion. Amplifiers, such as erbium-doped fiber amplifiers ("EDFA's"), are typically placed approximately every 80 kilometers along an optical fiber to boost signal strength. However, such amplifiers impose their own distortions on the signal power spectral distribution (as a function of wavelength). One of the major distortions is caused by the non-uniform gain profile (as a function of wavelength) of the amplifiers, which imposes a non-uniform spectral distribution on the amplified signals. It is especially important in wavelength division multiplexed ("WDM") networks to maintain a uniform spectral distribution across all channels.

Static filters are often used to attenuate the signal power as a function of wavelength to achieve a substantially uniform power distribution. Static filters, however, cannot adapt to dynamically changing conditions such as amplifier aging, temperature variations, channel add/drop, fiber loss and other changes in components along the transmission line. Moreover, the required filter shape is dependent upon system configuration, e.g., the spacing between amplifiers. Static filter characteristics cannot be modified to compensate for these changes without replacing the filter itself.

To overcome these problems, it is known in the art to employ dynamic wavelength tunable filters to flatten or equalize the signal spectrum, as well as to obtain any desired spectral shape. One such filter is an all-fiber acousto-optic tunable filter ("AOTF") described in U.S. Pat. No. 6,233,379, entitled "Acousto-optic filter," which is assigned to the assignee of the present invention and incorporated by reference herein. As described in the patent, the all-fiber AOTF is a multiple notch filter, with a transfer function characterized by notch depth and center frequency (or wavelength). One problem with the all-fiber AOTF is that the effect of the filter on light in the fiber is polarization-dependent. For example, although the filter may attempt to place a notch at one desired center frequency, the notch will effectively be placed at a different center frequency for each polarization— splitting one notch into two. The relative frequency shift between the polarization-dependent notches causes a difference between the transmissions of the different polarizations through the filter as a function of frequency, which results in a polarization-dependent loss in the filter. It is desired to reduce the polarization dependence of light in optical fiber, and to thereby reduce PDL in an all-fiber AOTF.

SUMMARY OF THE INVENTION

This invention relates to a method of making optical fiber having low polarization dependence and an acousto-optical filter, generally of the kind described in U.S. Pat. No. 6,266,462, with low PDL. Light propagating through a cladding thereof has a mode group having a first eigenmode propagating at a first speed and a second eigenmode propagating at a second speed. Manufacture of the fiber is controlled so that a difference between the first and second speeds is small. A difference between the speeds divided by the first speed is preferably less than $5 \times 10^{-7}$.

The optical fiber may be used for constructing an acousto-optical filter. The filter includes a support, and first and second mounts at spaced locations on the support. The optical fiber has first and second mounted portions secured to the first and second mounts respectively. A signal generator is operable to generate a periodic signal. An electro-acoustic transducer has a terminal connected to the signal generator and an actuating portion, the electric signal causing vibration of the actuating portion, and the actuating portion being connected to the interaction length so that the vibration generates a transverse wave traveling along the interaction length. Such a filter has the ability to reduce an amplitude of one or more selected wavelengths of light as the light travels through the interaction length.

BRIEF DESCRIPTION OF THE DRAWINGS

The invention is further described by way of example with reference to the accompanying drawings, wherein:

FIG. 9 is a view similar to FIG. 7 illustrating coupling of x-polarized light into the cladding layer;

FIG. 10 is a view similar to FIG. 9 illustrating coupling of y-polarized light into the cladding layer;

DETAILED DESCRIPTION OF THE INVENTION

Figure 1:
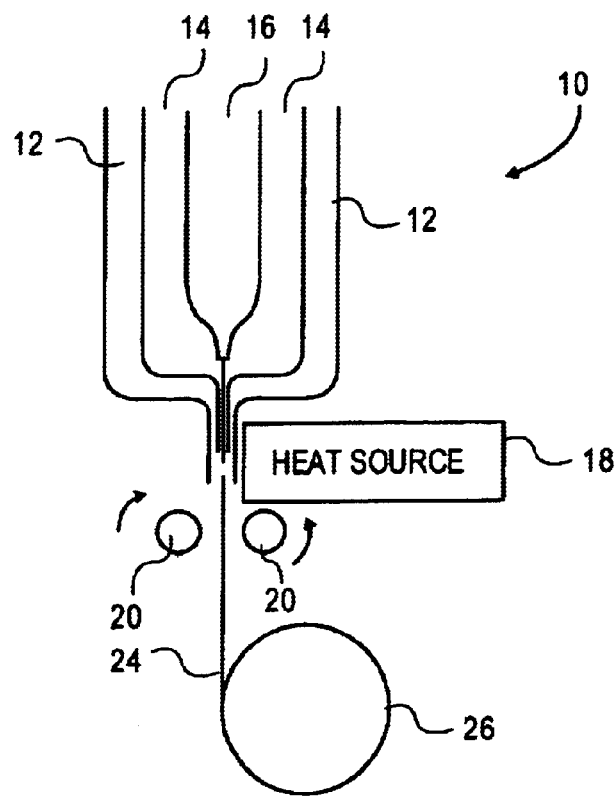
FIG. 1 is a side view illustrating manufacturing of optical fiber.

Optical fiber fabrication typically consists of two major steps: preform fabrication and fiber drawing. There are a number of different methods for preform fabrication, such as modified chemical vapor deposition (MCVD), outside vapor deposition (OVD), and vapor-phase axial deposition (VAD). FIG. 1 shows a preform 10 that is manufactured utilizing the MCVD technique. The process is initiated with a silica tube 12, which eventually forms an outer cladding layer of a fiber. An inner cladding material 14 is deposited on an inner surface of the silica tube 12, and eventually becomes an inner cladding layer of the fiber. A core material 16 is deposited on the inner cladding material 14.

A heat source 18 is located near an end of the preform 10. The heat source 18 heats the end of the preform 10 to approximately 2000° C. to melt it. Rollers 20 engage with material melted out of the end of the preform 10. The rollers 20 rotate, thereby drawing an optical fiber 24 out of the preform 10. As the fiber is drawn, a polymer jacket material (not shown) is coated on the fiber. The optical fiber 24 shown here is a single-mode fiber which is composed of the materials 12, 14, and 16, and is rolled into a roll 26.

Figure 2:
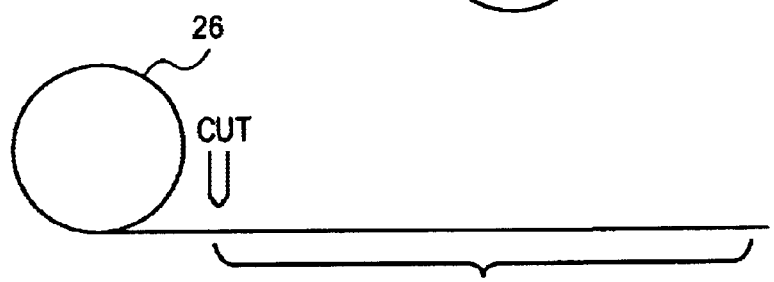
FIG. 2 is a side view illustrating severing of a length of optical fiber manufactured according to the process shown in FIG. 1.
Figure 3:
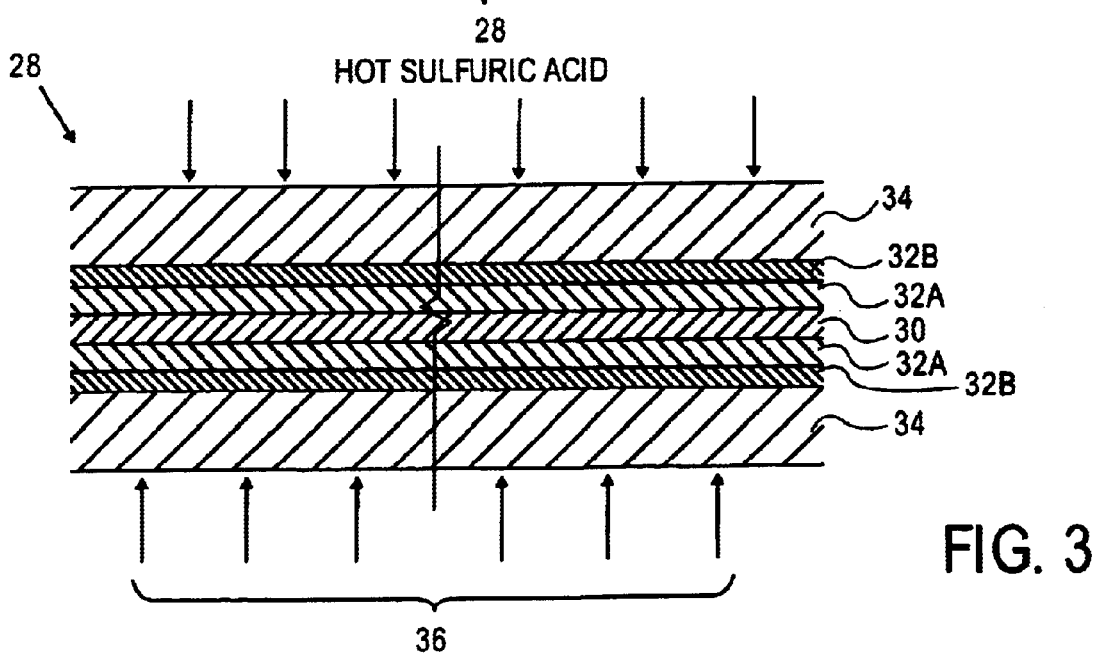
FIG. 3 is a cross-sectional side view of an interaction length of the severed length of the optical fiber of FIG. 2.

In FIG. 2, a length 28 of the fiber 24 is paid out from the roll 26 and cut from the remainder of the fiber on the roll 26 for the purpose of constructing an optical filter according to the invention. FIG. 3 illustrates in cross section a portion of the severed length 28. The optical fiber 24 includes a glass core 30 made of the core material 16, a cladding layer 32 surrounding the core 30, wherein the cladding layer itself may include an inner cladding layer 32A surrounding the glass core 30, and an outer cladding layer 32B surrounding the inner cladding layer 32A. A jacket 34 surrounds the cladding layer 32B.

Figure 4:
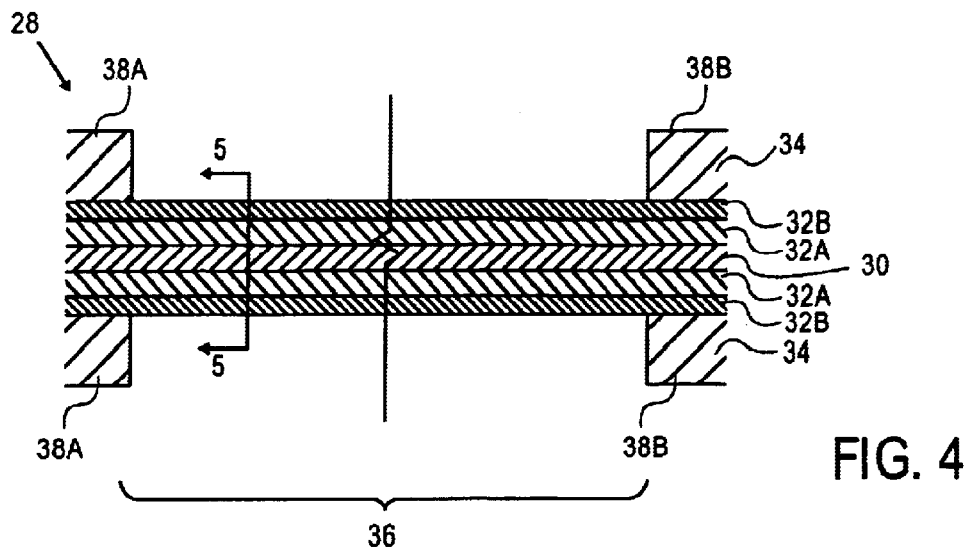
FIG. 4 is a view similar to FIG. 3 after a section of a jacket of the optical fiber is stripped.

As part of the process of constructing a filter according to the invention, a portion of the jacket 34 is removed to expose a section 36 of the fiber. A number of techniques may be employed to remove the jacket, including mechanical stripping and exposure to hot sulfuric acid, among others. FIG. 4 illustrates the severed length 28 after a portion of the jacket is stripped from the section 36. First and second portions 38A and 38B of the jacket remain on the cladding layer 32. The portions 38A and 38B are located on opposing sides of the stripped section 36.

In order to achieve guiding characteristics, the core 30 is designed to have a higher refractive index than the cladding region by adding impurities such as $GeO_2$ and $P_2O_5$ to the $SiO_2$ basis of the core material 16. Such impurities in the core 30 not only create the required refractive index difference with respect to the cladding layers 32A and 32B, but also make the coefficient of the thermal expansion (CTE) and the melting temperature different from that of the cladding. Therefore, when the preform is fabricated at a high temperature of approximately 2000° C. and cooled down to room temperature, a significant amount of stress is generated in the core 30 and the cladding layers 32A and 32B. This inherent stress is called "thermally-induced stress."

Moreover, when the preform 10 is pulled to the optical fiber 28 at the drawing tower, the optical fiber is exposed to a drawing tension of typically 100–1,000 N, and this stress becomes frozen in the optical fiber 24 while the optical fiber 24 is cooled down to room temperature. Therefore, an additional stress field is created in the optical fiber, which is called "mechanically-induced stress."

Figure 5A:
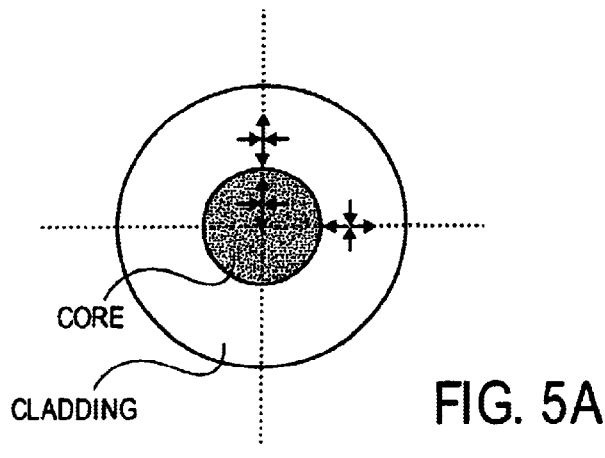
FIG. 5A is a cross-sectional end view on 5—5 in FIG. 4 illustrating stresses in a cladding layer of the interaction length.
Figure 5B:
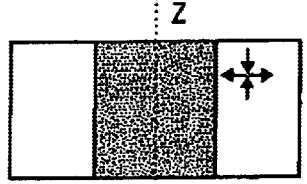
FIG. 5B is a cross-sectional plan view through a section of the optical fiber.

FIGS. 5A and 5B show the combined stress profile. The core is under axial, radial, and tangential tensile stress. The cladding 32A and 32B is under radial tensile stress and under axial and tangential compressive stress. There is thus a discontinuity of the stress field in the core-cladding interface.

Figure 6:
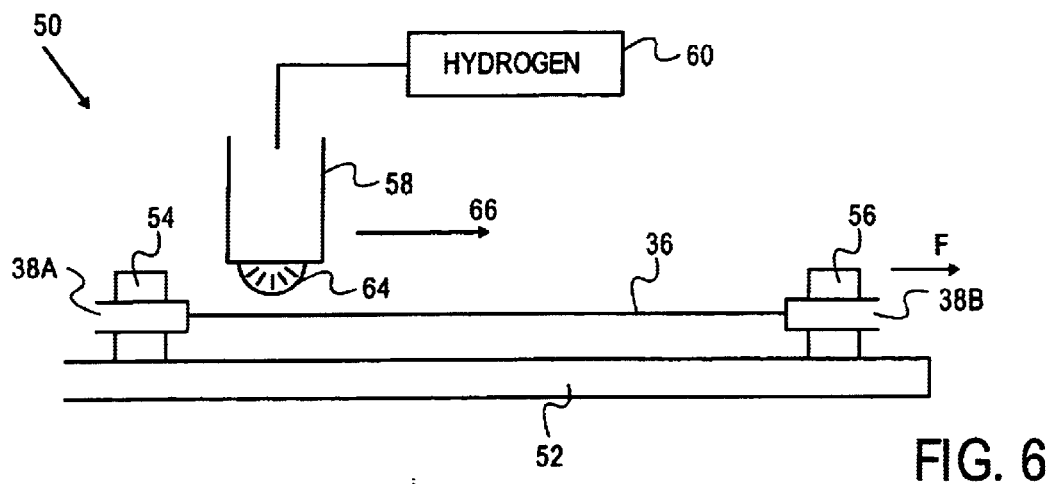
FIG. 6 is a side view illustrating an apparatus that is used to anneal the cladding layer of the interaction length.

According to the invention, the cladding layer 32 of the stripped section 36 is then annealed utilizing an apparatus 50, as shown in FIG. 6. The apparatus 50 may employ, for example, a modified CW-200 Fused Coupler/WDM workstation sold by Lightel Technologies, Inc. of Kent, Wash. The apparatus 50 includes a support structure 52, first and second attachment formations 54 and 56 respectively, a flame nozzle 58, and a hydrogen source 60.

The attachment formation 54 is rigidly secured to the support structure 52. The attachment formation 56 is movably secured to the support structure 52. The hydrogen source 60 is connected to the flame nozzle 58. The flame nozzle 58 is secured to the support structure 52 for movement between the attachment formations 54 and 56.

In use, the portions 38A and 38B of the jacket 34 are attached to the first and second attachment formations 54 and 56, respectively. A force F is applied, which tends to move the attachment formation 56 away from the attachment formation 54, thereby creating a tension in the stripped section 36.

Hydrogen from the hydrogen source 60 flows to the flame nozzle 58 and is lit at an exit from the nozzle 58 to create a flame 64. The nozzle 58 and the flame 64 are located above the stripped section 36 so as to heat the stripped section 36 from above. Hydrogen may be preferred to any other source of fuel because hydrogen combustion does not produce carbon or hydrocarbon byproducts that may deposit on the cladding layer 32. Those skilled in the art will recognize that electro-resistive and other heating sources may be employed in the present invention instead of the hydrogen flame described in this example.

The nozzle 58 moves in a direction 66 parallel to the longitudinal axis of the stripped section 36. The advancing flame 64 heats areas of the stripped section 36 as those areas are exposed to the flame 64. Heating of the stripped section 36 is primarily due to radiation from the flame 64. Regions of the stripped section 36 trailing the flame 64 are allowed to cool. Cooling of the stripped section 36 is primarily due to convection of the heat to ambient air. The force F compensates for heat-induced elongation of the stripped section 36 by moving opposing ends of the stripped section 36 apart. The fiber is heated and cooled without the core 30 expanding by more than 20%.

The effect of heating and cooling the stripped section 36 is that the cladding layers 32A and 32B are annealed. Fiber formed by modified chemical vapor deposition has stress characteristics that are particularly conducive to the beneficial effects of this process.

The flame 64 may be in the range 1–20 mm wide as measured along the stripped section 36. The flame 64 may be held at a distance of 0.1–5 mm, or more particularly, 0.5–5 mm from the stripped section 36. Movement of the flame in the direction 66 may be at a speed of 1–50 mm per second, or, more particularly, 1–10 mm/s. The stripped section 36 may be heated to a temperature between 500–1300° C., and, more particularly, to between 800–1000° C. The force F may be in the range 0.05–0.5 N, or, more particularly, 0.05–0.15 N, maintained substantially constant.

Figure 7:
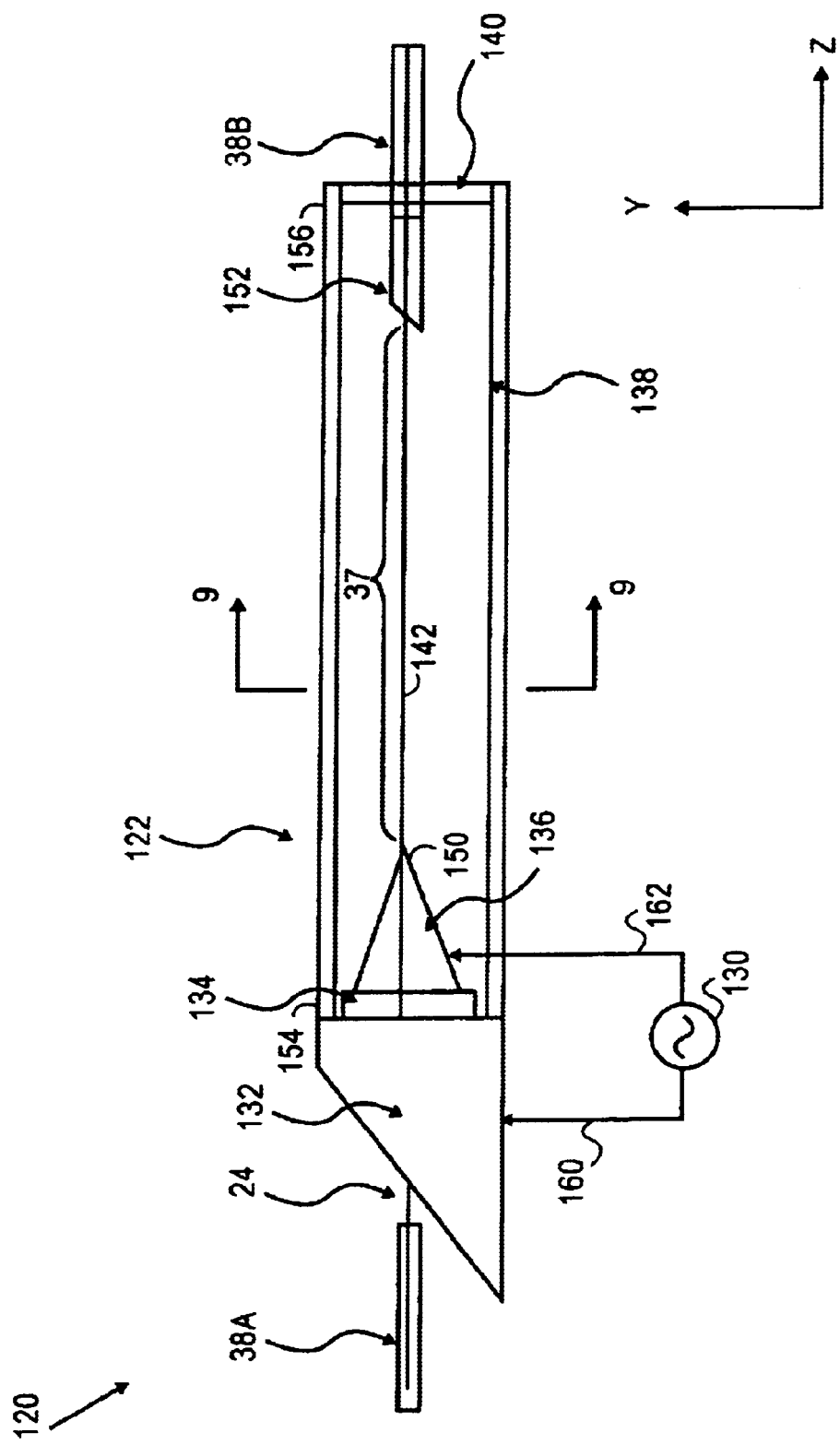
FIG. 7 is a cross-sectional side view of an acousto-optical tunable filter according to an embodiment of the invention.

FIG. 7 of the accompanying drawings illustrates an acousto-optic filter 120 constructed according to an embodiment of the invention. The filter 120 is of the kind described in U.S. Pat. No. 6,266,462, issued Jul. 24, 2001, which is incorporated herein by reference. The filter 120 includes a mounting construction 122, the severed length 28 of the optical fiber, and an electrical signal generator 130.

The mounting construction 122 includes a heat sink 132, an acoustic wave generator, such as a piezo-electric transducer 134, an acoustic wave propagation member 136, such as an aluminum horn, an outer tube arrangement 138, and an end plug 140.

Gold terminals are sputtered on opposing surfaces of the piezo-electric transducer 134. One terminal is located against the heat sink 132 and attached to the heat sink 132. The base of the acoustic wave propagation member 136 is then attached to an opposing terminal of the piezo-electric transducer 134.

Openings are made in the heat sink 132, piezo-electric transducer 134, and acoustic wave propagation member 136 to form a continuous passage. The end of the severed length 28 having the first portion 38A of the jacket is inserted through the opening of the acoustic wave propagation member 136, whereafter it is inserted through the openings in the piezo-electric transducer 134 and the heat sink 132.

The second portion 38B of the jacket is then located in a groove in the end plug 140. A resin is then placed in the groove and allowed to cure, thereby securing the second portion 38B of the jacket to the end plug 140.

Resin is also applied to the fiber 24 where it protrudes from a tip 150 of the acoustic wave propagation member 136, and flows into the tip 150 of the acoustic wave propagation member 136. The resin then cures and secures the fiber 24 to the tip 150 of the acoustic wave propagation member 136.

A damper 152 is located on the optical fiber 142. The damper 152 is coaxially disposed on the stripped section 36 adjacent to the second portion 38B of the jacket. The length of exposed fiber from the tip 150 to the end of the damper 152 nearest the tip 150 is the "interaction length 37" of the filter. Generally, the interaction length or "interaction region" is the length of fiber in which light is coupled from one mode to another, and, more particularly in this case, the portion of the exposed section 36 not covered by the damper 152.

An end 154 of the outer tube arrangement 138 is then located over the second portion 38B of the jacket and moved over the end plug 140 until it contacts a surface of the heat sink 132. A second, opposing end 156 of the outer tube arrangement 138 is located over the end plug 140. The positioning of the end plug 140 is then adjusted within the end 156. By adjusting the positioning of the end plug 140, the interaction length 37 of the optical fiber 142 is tensioned by about 0.2 N to eliminate slack. When a predetermined tension in the interaction length 37 is reached, a resin is applied to an interface between the end plug 140 and the end 156. The resin is allowed to cure, thereby securing the end plug 140 stationarily within the end 156. The tension of the interaction length 37 is thereby set.

The signal generator is connected to the transducer 134 through leads 160 and 162. The lead 160 couples to the heat sink 132, which is itself electrically coupled to a terminal on one face of the transducer 134. The lead 162 is electrically connected to the opposing face of the transducer 134, either directly to the terminal on the opposing face, or indirectly through the acoustic wave propagation member 136. The heat sink 132 and the acoustic wave propagation member 136 can be made of conductive aluminum so that the terminals on the opposing sides of the piezo-electric transducer 134 are at the voltages of the leads 160 and 162, respectively. A voltage potential is thereby created across the piezo-electric transducer 134.

The signal generator 130 applies across the piezo-electric transducer 134 a voltage at one or more frequencies in the range of 0–20 MHz, or more particularly, 0–3 MHz. The voltage signal applied across the piezo-electric transducer 134 causes opposing surfaces of the piezo-electric transducer 134 to vibrate relative to one another in a direction transverse to a longitudinal axis of the interaction length 37. Adjusting the frequency and amplitude of the electrical signal applied to the transducer results in a corresponding change in the frequency and amplitude, respectively, of the mechanical vibration of the transducer. Those skilled in the art will recognize that the invention may employ acoustic wave exciters other than the acoustic wave exciter formed from the combination of the signal generator 130, transducer 134, and acoustic wave propagation member 136 described herein.

Vibrations of opposing surfaces of the piezo-electric transducer 134 are transferred through the acoustic wave propagation member 136 to the tip 150 thereof. The tip 150 vibrates periodically in response to the change in the voltage. Movement of the tip 150 is transferred to the end of the interaction length 37 closest to the tip 150.

Figure 8:
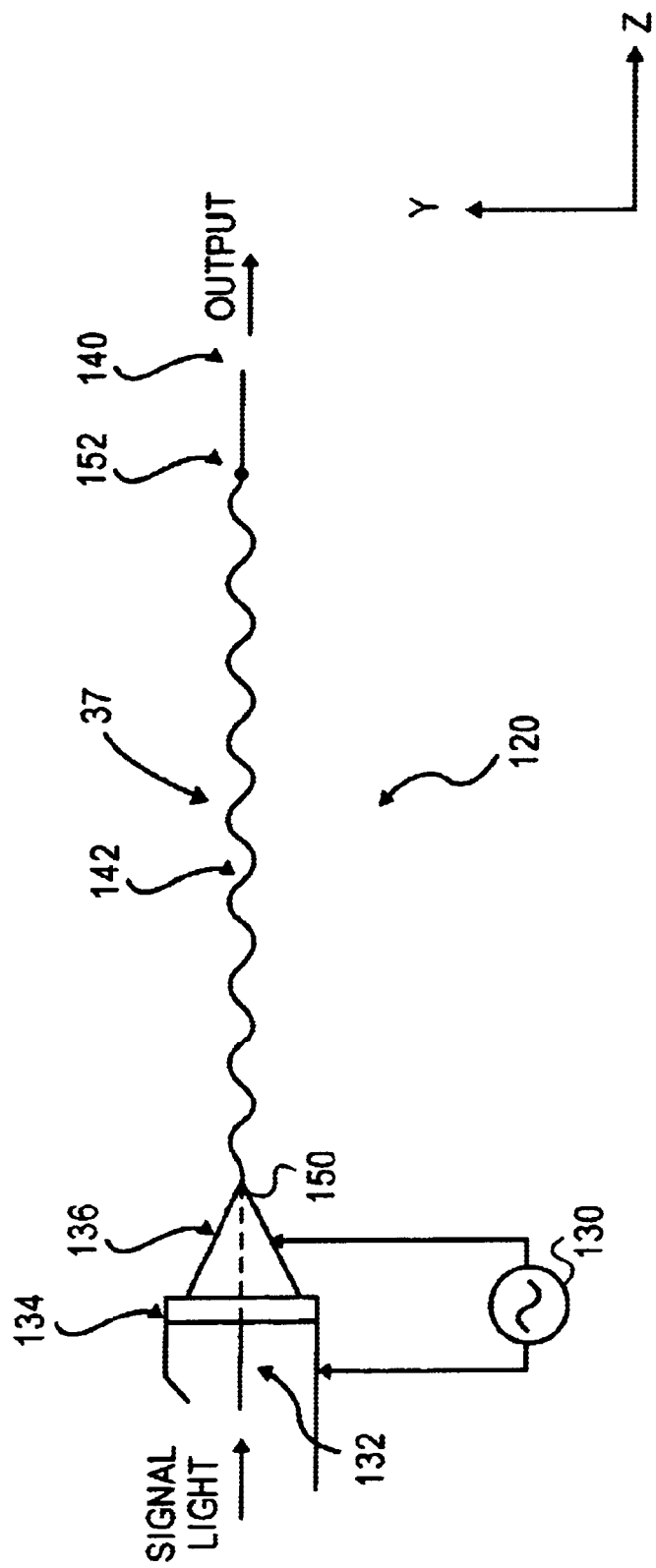
FIG. 8 is a side view illustrating functioning of the filter.

FIG. 8 illustrates how vibration of the tip 150 imposes acoustic waves in the interaction length 37. In the present example, the waves are y-direction transverse flexural waves that travel along the interaction length 37 from the tip 150 to the damper 152. The damper 152 is designed to absorb the waves or otherwise minimize reflection of the waves back to the tip 150. The creation of a standing wave is thereby prevented.

In use, the filter 120 is inserted into a fiber optic transmission line. A light signal is transmitted through the core 30. The light signal may be modulated as a WDM signal having many channels, each at a different wavelength. For various reasons, including the non-uniform gain profiles of amplifiers along the fiber optic transmission line, the intensity of light may differ from channel to channel at the point where the light enters the optical fiber 142 of the filter 120.

The effect of the acoustic waves in the interaction length 37 is that the intensity of selected wavelengths of light traveling through the interaction length 37 is attenuated by coupling these wavelengths from a mode in the core into one or more modes in the cladding layer 32 of the interaction length 37. This coupling creates a notch in the transmission spectrum centered at each selected wavelength. By changing the frequency of the applied electrical signal, and thus the frequency of the acoustic waves in the interaction length 37, the center wavelength of the notch can be altered. Furthermore, by changing the magnitude of the applied voltage (and thereby the magnitude of the acoustic wave), the depth of the notch (representing the amount of light coupled to the other mode) can be changed. By cascading multiple acoustic exciter/interaction length combinations and/or applying multiple acoustic frequencies with each exciter, a combination of notches of different optical center frequencies and depths may be achieved, thereby allowing creation of a desired filter transfer-function as described in Ser. No. 09/738,282 now U.S. Pat. No. 6,532,323 B2. Such a filter may be employed for gain equalization purposes. Those skilled in the art will recognize that, as an alternative to coupling light between core and cladding modes, an AOTF may also couple light between different core modes. Further details of the functioning of the filter 120 are described in U.S. Pat. No. 6,266,462 referenced above.

FIGS. 9 and 10 illustrate how light is coupled into the cladding layer 32 after application of an acoustic wave. These figures are for conceptual purposes only, and do not necessarily reflect the actual intensity distribution in the fiber. Light traveling in the core mode in the core 30 couples into both an x-polarized cladding mode including regions 70 and 72 in the cladding 32 (as shown in FIG. 9), and into a y-polarized cladding mode including regions 80 and 82 (as shown in FIG. 10). X-polarized and y-polarized components of light traveling in the core couple preferentially into corresponding x-polarized and y-polarized cladding modes, as shown in FIGS. 9 and 10, respectively. The arrows in FIGS. 9 and 10 indicate the direction and phase differences of the polarization of the light in each mode.

The center wavelength $\lambda_0$ of light coupling into the cladding layer 32 is a function of the index of refraction $\beta$ of the material of the cladding layer 32. At different points in the fiber, stress in the cladding layer changes the index of refraction $\beta$ to an effective index of refraction $\beta_{\it eff}$ which is different from the index of refraction $\beta$ without any stress in the cladding layer 32. As a result of this stress-induced change in refractive index, the center wavelength $\lambda_0$ shifts, and is thus also recognized as a function of stress in the cladding layer 32.

Referring to FIGS. 5A and 5B, there is a larger tensile stress in the x-direction than in the y-direction. The larger tensile stress in the x-direction results in an effective index of refraction in the x-direction $\beta_{\it eff\text{-}x}$ which differs from the index of refraction $\beta$ of the cladding layer 32 with no stress therein. The effective index of refraction in the y-direction $\beta_{\it eff\text{-}y}$ is, however, substantially equal to the index of refraction $\beta$ of the cladding layer 32 without stresses in the cladding layer 32. The effective index of refraction in the x-direction $\beta_{\it eff\text{-}x}$ is thus different from the effective index of refraction in the y-direction $\beta_{\it eff\text{-}y}$ due to the tangential stresses 40. Light coupling from the core 30 to x and y polarized modes, as shown in FIGS. 9 and 10, will thus be coupled at different center wavelengths, $\lambda_{0\text{-}x}$ and $\lambda_{0\text{-}y}$.

Figure 11:
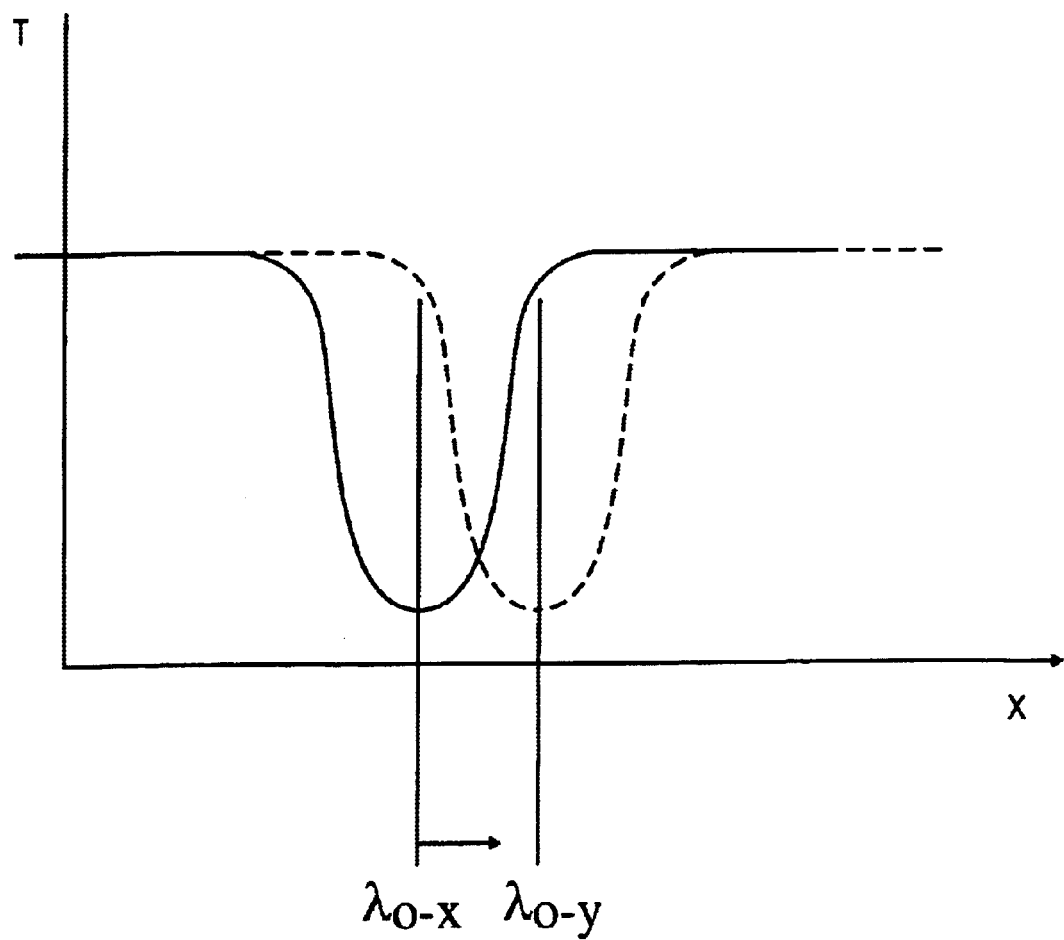
FIG. 11 is a graph illustrating transmission of x-polarized light and y-polarized light through a core of the fiber, both before and after annealing.

FIG. 11 illustrates how the filter of FIG. 7 filters light when the stresses are not reduced as in FIG. 5. Wavelengths $\lambda$ are shown on the abscissa and transmission T through the core 30 is shown on the ordinate. It can be seen that there is a relatively large difference between the center notch wavelength of x-polarized light $\lambda_{0\text{-}x}$ and the center notch wavelength of y-polarized light $\lambda_{0\text{-}y}$.

Annealing the cladding layer 32, as discussed with reference to FIGS. 5A and 5B, causes a reduction in tensile stress in the x-direction. A reduction in tensile stress in the x-direction causes a reduction in the stress difference between the x- and y-directions and a corresponding reduction in the difference between the effective index of refraction in the x-direction $\beta_{\it eff\text{-}x}$ and the effective index of refraction in the y-direction $\beta_{\it eff\text{-}y}$. There is also a corresponding reduction in the difference between the center wavelengths of x-polarized light $\lambda_{0\text{-}x}$ and y-polarized light $\lambda_{0\text{-}y}$, respectively. Referring again to FIG. 11, annealing causes the center notch wavelength of the x-polarized light $\lambda_{0\text{-}x}$ to move towards the center notch wavelength of y-polarized light $\lambda_{0\text{-}y}$, as indicated by the arrow. This reduction in the difference between the center notch wavelengths indicates a reduction in the polarization dependence of light coupling into the cladding layer, along with a corresponding reduction in the PDL of the filter.

Figure 12:
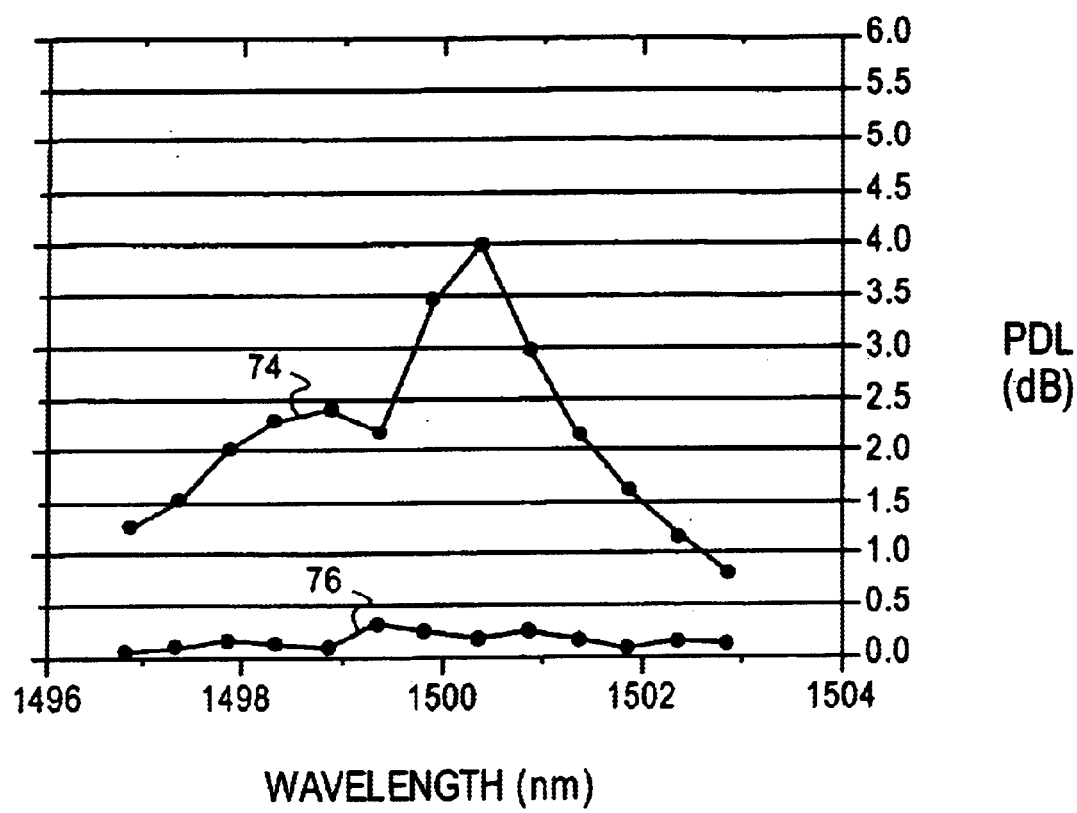
FIG. 12 is a graph illustrating PDL before and after annealing.

FIG. 12 illustrates the extent to which PDL is reduced. The PDL of the filter is defined by the following formula:

$$PDL = |T_x - T_y|, \qquad (1)$$

where $T_x$ is transmission in decibels (dB) of x-polarized light and $T_y$ is transmission in dB of y-polarized light through the core 30. The PDL before annealing is represented by line 74 and the PDL after annealing is represented by line 76. The PDL before annealing is as much as 4 dB before annealing, and less than 1.0 dB, or, more particularly, less than 0.5 dB, after annealing. PDL is proportional to the slope of the notch profile at a constant difference of $|\lambda_{0\text{-}y} - \lambda_{0\text{-}y}|$. Therefore, PDL is inversely proportional to the notch width. The notch width is inversely proportional to the length of the optical fiber 142.

Thermal annealing is not the only manner in which polarization dependece PDL can be reduced. An example will now be described wherein polarization dependece and PDL can be reduced by fine-tuning dopant index.

Figure 13:
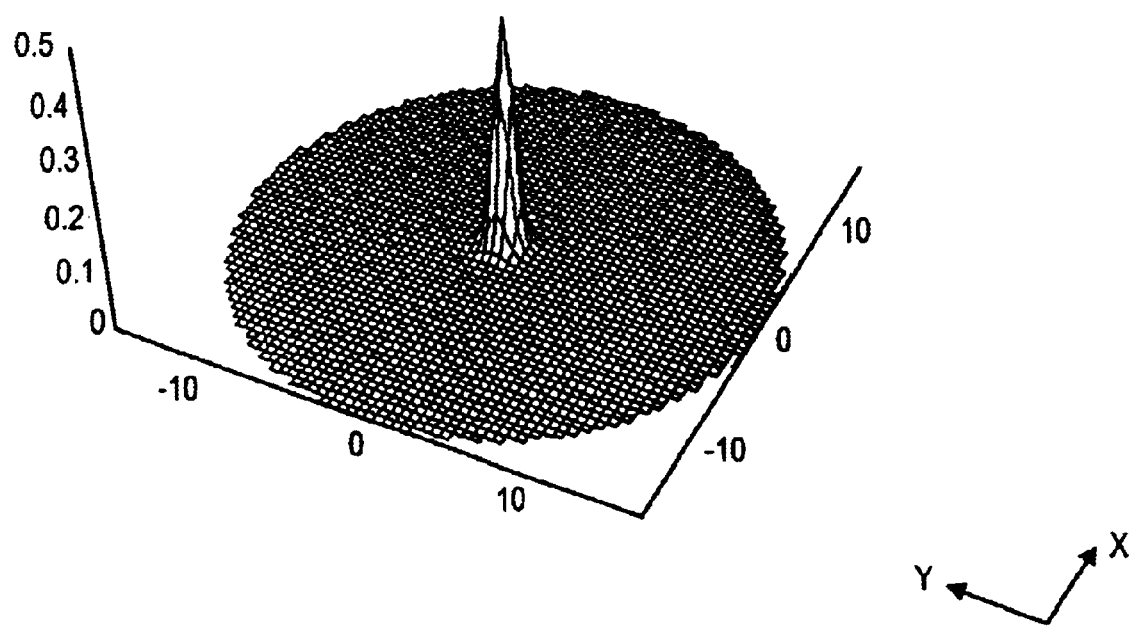
FIG. 13 is a three-dimensional representation of an intensity profile in a core of a fiber according to another embodiment of the invention.
Figure 14:
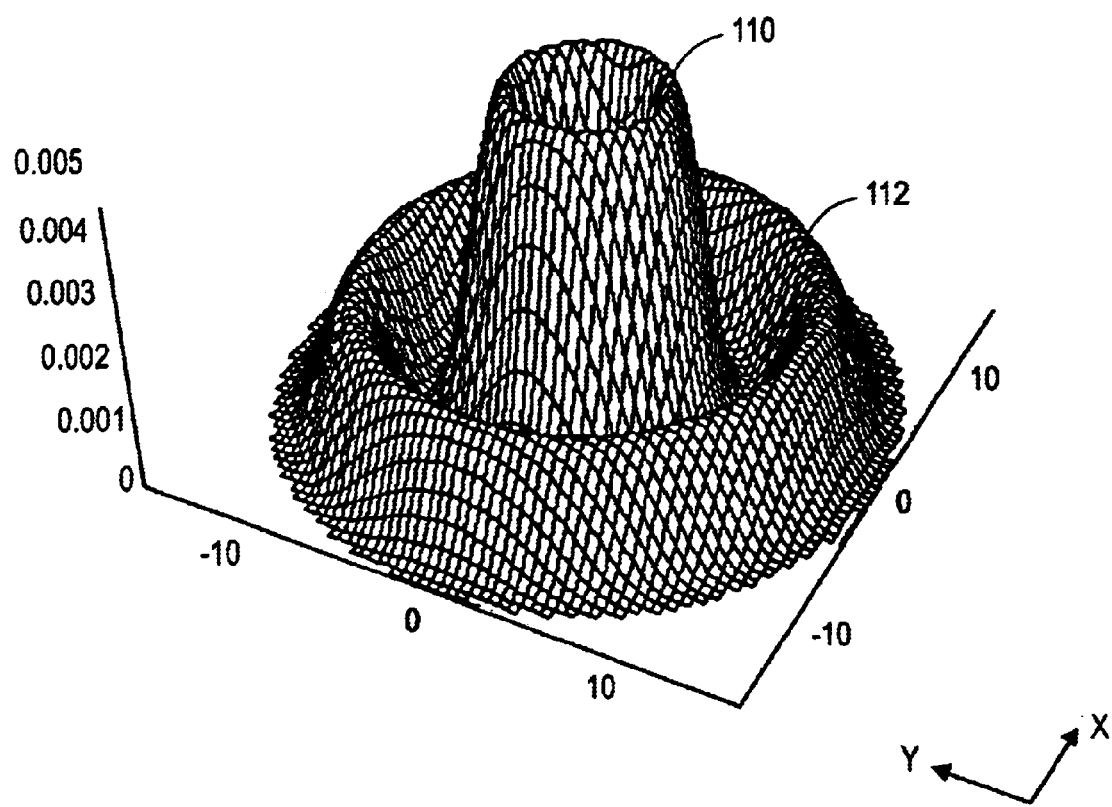
FIG. 14 is a three-dimensional representation of a second-order mode of light in a cladding of the fiber of FIG. 13.
Figure 15:
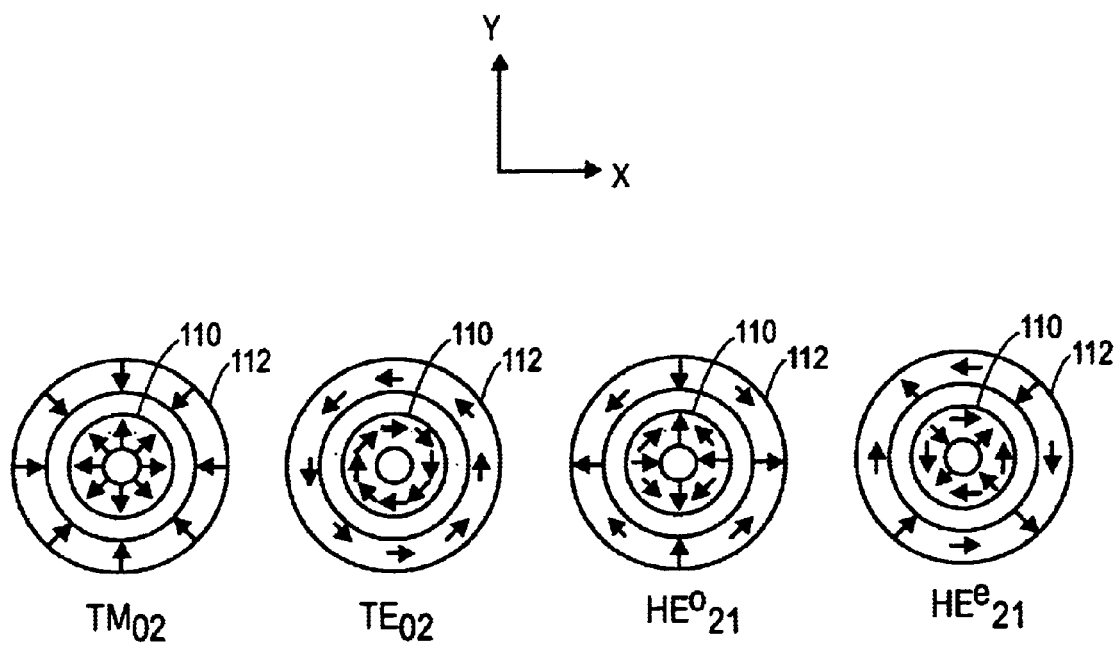
FIG. 15 illustrates the distribution of electric fields of four eigenmodes of the second-order mode group shown in FIG. 14.

FIG. 13 illustrates an intensity profile of light in a core of an optical fiber having a single-mode core. The intensity profile in the core is substantially Gaussian. FIG. 14 illustrates an intensity profile of a second-order mode of light through a cladding of the fiber. The intensity has a first circular peak of 110 near the core, and a second circular peak 112 further away from the core. The second-order mode of light in the cladding as illustrate in FIG. 13 includes four eigenmodes of electric fields. The eigenmodes are illustrated in FIG. 15, and included $TM_{02}$, $TE_{02}$, $HE^o_{21}$, and $HE^e_{21}$. The eigenmode $TM_{02}$, for example, has an electric field which is radially outward from the core at the inner peak 110 and radially inward toward the core at the outer peak 112.

The eigenmodes do not necessarily propagate at the same speed through the cladding. Polarization dependence can reduced by reducing the differences in speeds between the eigenmodes. In the case where a y-directional flexural wave is created, it is required to reduce the difference in speed between the $TM_{02}$ and $TE_{02}$ eigenmodes in order to reduce PDL. The description that follows primarily focuses on reducing speed differences between the $TM_{02}$ and $TE_{02}$ eigenmodes. It should, however, be understood that acoustic waves other than y-directional flexural waves may require speed matching of two or more of the other eigenmodes.

Figure 16:
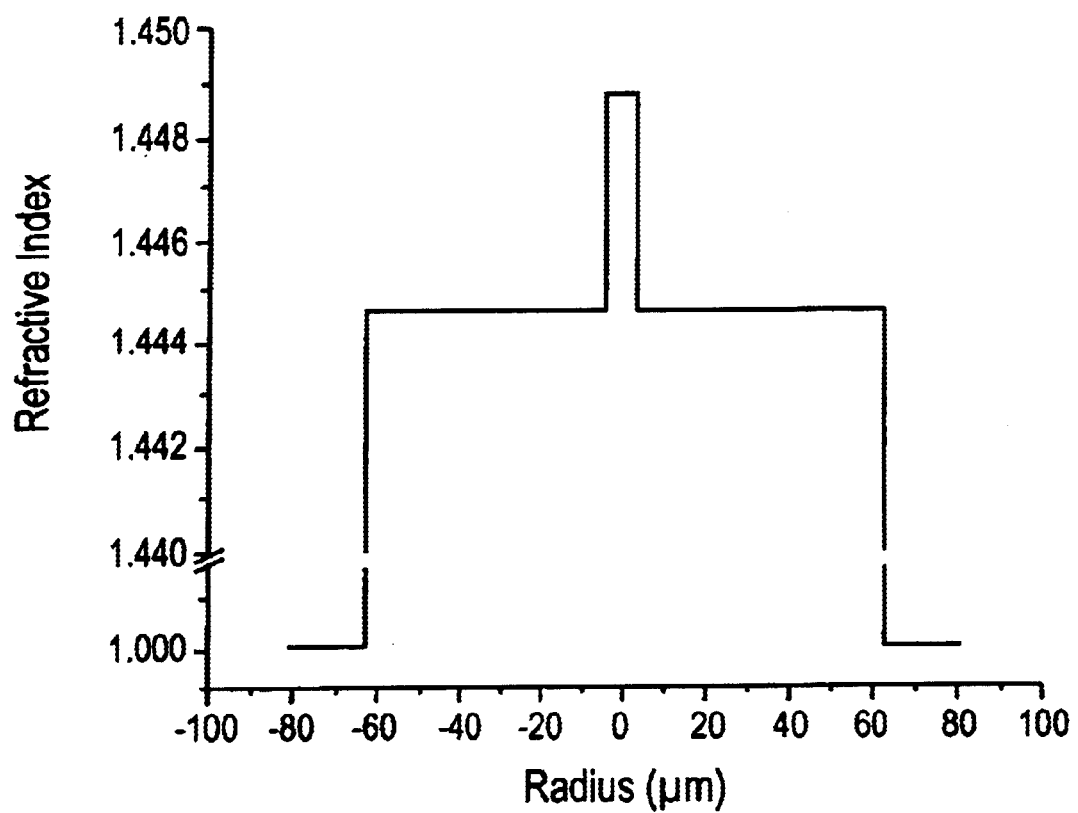
FIG. 16 is a graph illustrating a refractive index profile through a cross-section of the fiber.

FIG. 16 illustrates a refractive index profile through a cross-section of the fiber. The core of the fiber has a radius of approximately 4.15 microns, the inner cladding has a radius of approximately 8.3 µm, and the outer cladding has a radius of approximately 62 microns. The core has a refractive index of approximately 1.449. Both the inner and outer cladding layers have a refractive index of approximately 1.4448 (a refractive index of 1.000 indicates air).

The refractive index and stress profiles can be created by modifying dopant concentrations in the core and the cladding. In order to have the wave-guide characteristic, the core has the higher refractive index than the cladding by doping materials such as germanium. There are many doping materials known to us, which can either increase or decrease the refractive index in proportion to the concentration. The doping materials can affect the glass melting temperature as well as the coefficient of thermal expansion and thereby determine the residual stress profile of the fiber after the drawing process. In many cases, more than one doping material is deposited in the core and the inner cladding to achieve a desired refractive index profile and a desired stress profile. For example, fluorine is often used together with germanium to counteract the index increase by germanium in the inner cladding layer. Phosphorous is another material often used in the cladding layer to make the drawing process easy. Because of its low melting point, phosphorous is often used to create high residual stress in the fiber. In general, the core and the cladding can consist of multiple dopant layers with different doping materials and concentrations, in order to have a desired index profile as well as a desired stress profile.

Figure 17:
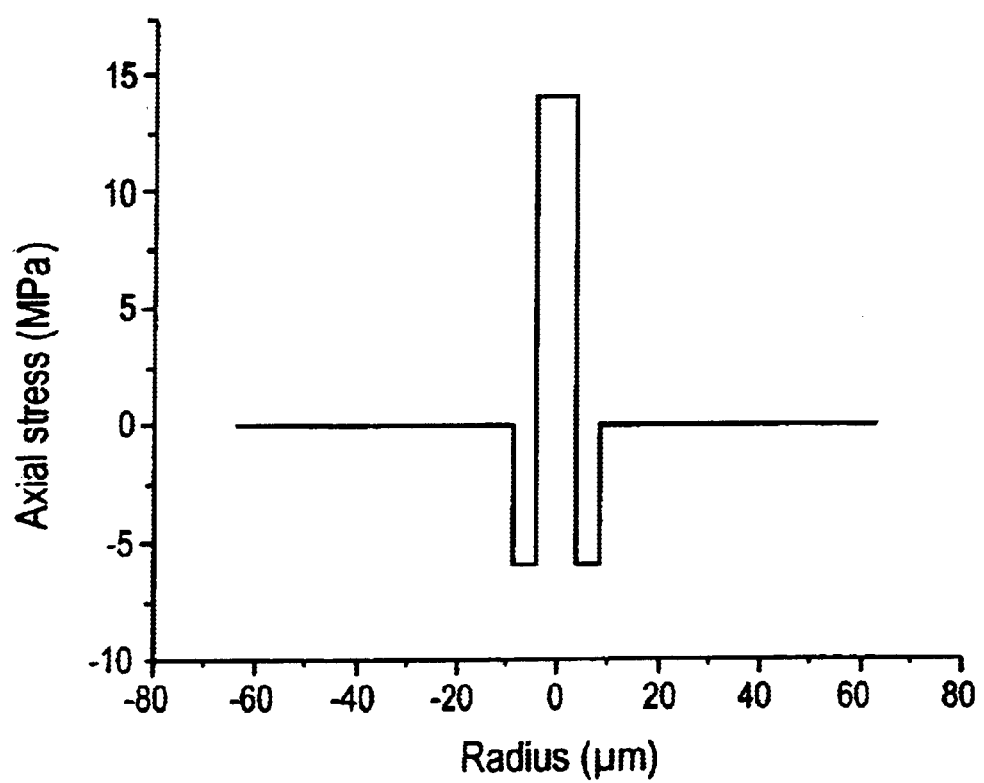
FIG. 17 is a graph which illustrates the axial component of a stress profile through the fiber.
Figure 18:
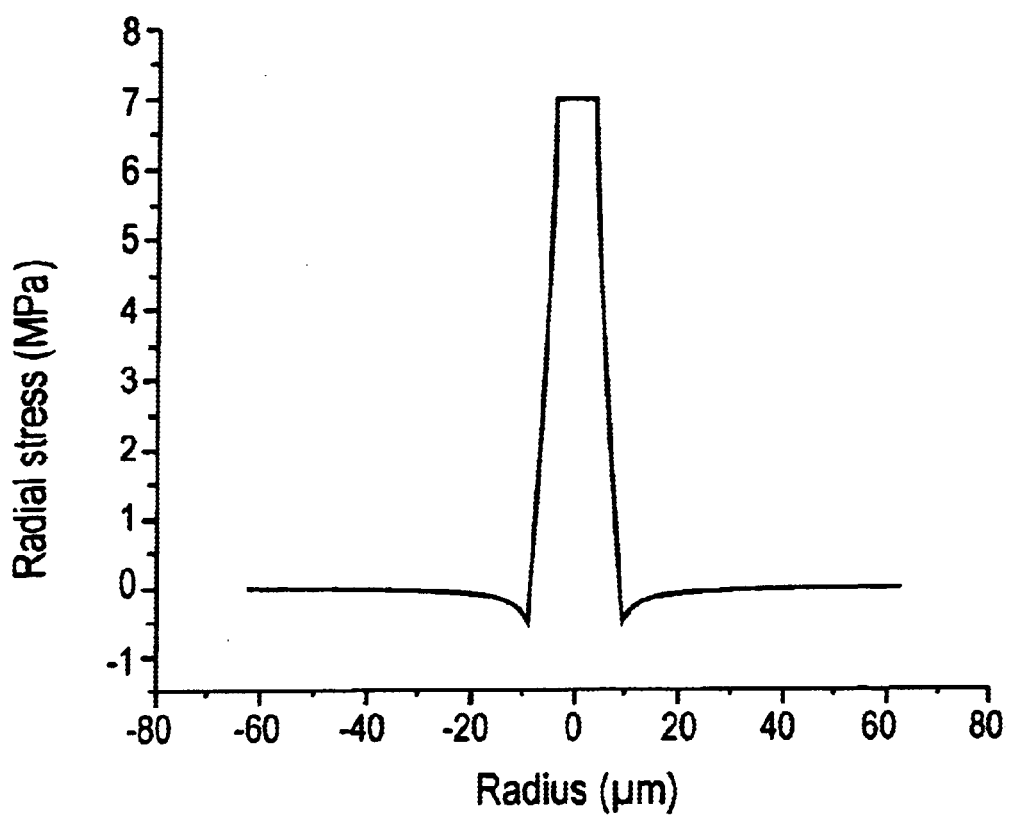
FIG. 18 is a graph which illustrates the radial component of the stress profile through the fiber.
Figure 19:
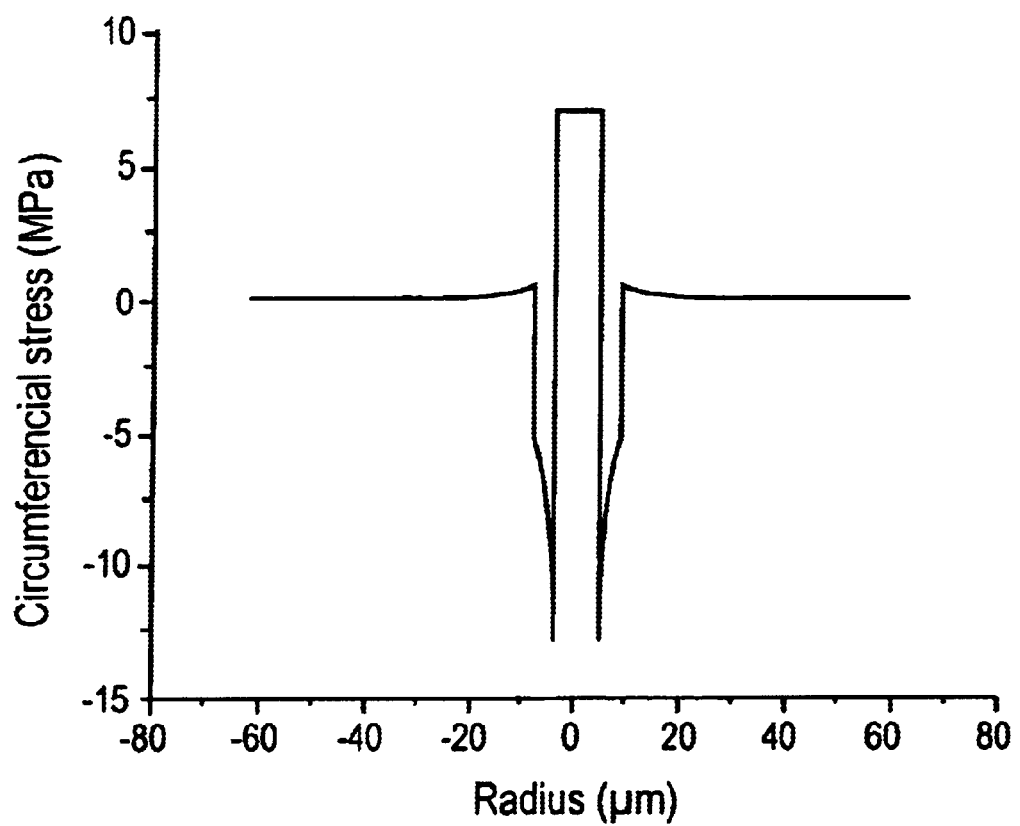
FIG. 19 is a graph which illustrates the circumferential component of the stress profile through the fiber.

FIG. 17 illustrates an axial component of stresses in the fiber. Stresses are induced due to differences in thermal expansion of the core, inner cladding, and outer cladding. In another embodiment, it may be possible to affect propagation speeds of eigenmodes by mechanically inducing stresses such as inducing a drawing tension. A positive value indicates tensile stress, and a negative value indicates compressive stress. The core is under a tensile stress of approximately 15 MPa. The inner cladding, having a radius of approximately 8.3 microns, is under a compressive stress of approximately 6 MPa. The outer cladding has substantially no stress in an axial direction. Radial and circumferential stresses are related to the axial stress in the fiber, and are indicated in FIGS. 18 and 19, respectively.

Figure 20:
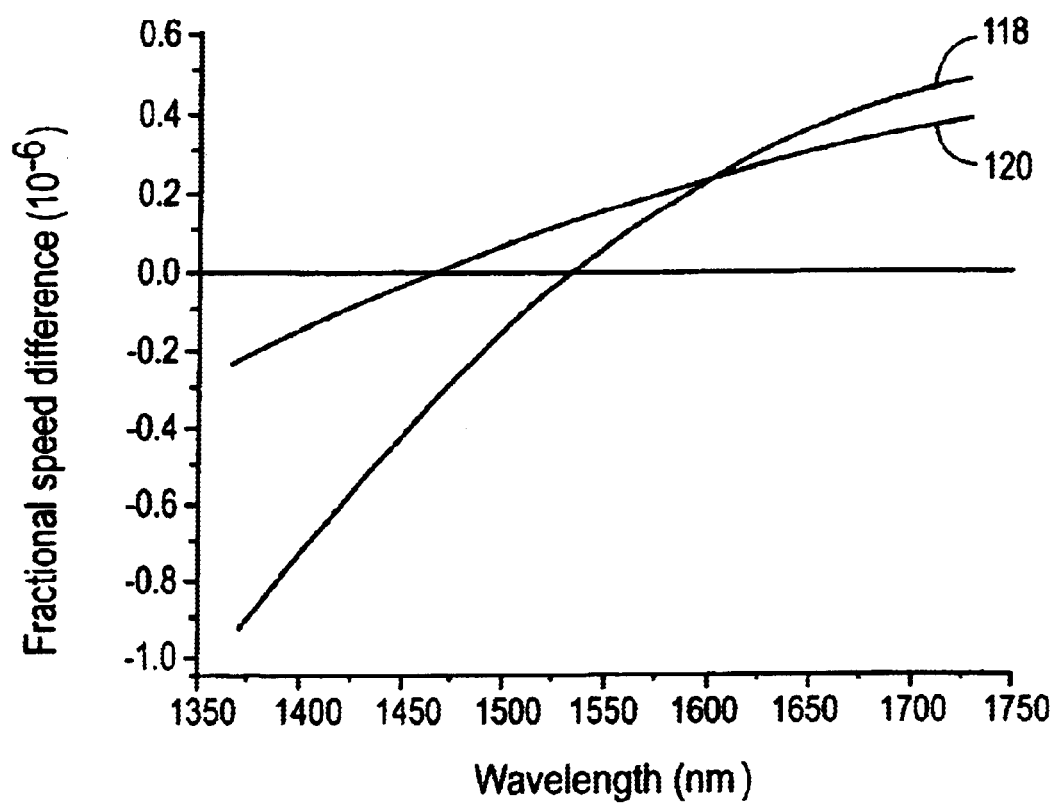
FIG. 20 is a graph which illustrates a fractional speed difference between the eigenmodes of FIG. 15 against notch wavelength.

By fine-tuning the refractive index and axial stress profiles, fractional speed differences can be obtained as illustrated in FIG. 20, which illustrates a fractional speed difference between eigenmodes against the wavelength of the notch. The line 118 indicates the difference in speed between $TM_{02}$ and $TE_{02}$, divided by the speed of $TM_{02}$. The line 120 indicates the difference in speed between $HE^o_{21}$ and $TE_{02}$, divided by the speed of $HE^o_{21}$. It can be seen that the absolute value of this fractional speed difference between $TM_{02}$ and $TE_{02}$ is less than $5 \times 10^{-7}$ for all notch wavelengths between 1450 and 1750 nm. The fractional speed difference, B, between $TM_{02}$ and $TE_{02}$ modes can be expressed by the following equation:

$$|B| = |(\text{speed of } TM_{02} - \text{speed of } TE_{02})/\text{speed of } TM_{02}| < 5 \times 10^{-7} \quad (2)$$

It may occur that a fiber having refractive index and axial stress profiles somewhat resembling the profiles shown in FIGS. 16 and 17 may not be fine-tuned to obtain fractional speed differences as illustrated in FIG. 20 to reduce polarization dependence according to the invention. Stress and refractive index profiles are optimized so that the result side of the following equation is as small as possible, preferably below $5 \times 10^{-7}$:

$$\left| \int_0^{2\pi} \int_0^R (|E_{TM_{02}}|^2 n_{r\,stress} - |E_{TE_{02}}|^2 n_{\theta\,stress}) r\,dr\,d\theta - \left( n^{eff}_{TM_{02}no\,stress} - n^{eff}_{TM_{02}no\,stress} \right) \right| = \text{result} \quad (3)$$

where:

R is an outer radius of the cladding;
$E_{TM_{02}}$ is an electric field of an second-order of a transverse-magnetic mode, designated the $TM_{02}$ mode;
$E_{TE_{02}}$ is an electric field of an second-order of a transverse-electric mode, designated the $TE_{02}$ mode;
$r$ is a radius of a location from a center point of the core;
$\theta$ is an angle between a reference line from the center point and a line from the center point to the location;
$n^{eff}_{TM_{02}no\,stress}$ is an effective refractive index of the $TM_{02}$ mode, calculated by an optical waveguide theory when the fiber is under no residual stress, based on Maxwell equations;
$n^{eff}_{TM_{02}no\,stress}$ is an effective refractive index of the $TE_{02}$ mode, calculated by an optical waveguide theory when the fiber is under no residual stress, based on Maxwell equations;
$N_{r\,stress}(r,\theta)$ is a refractive index as perceived by an electric field polarized in a radial direction at a location $(r,\theta)$ when the location is under a residual stress;
$n_{\theta stress}(r,\theta)$ is a refractive index as perceived by an electric field polarized in a circumferential direction at a location $(r,\theta)$ when the location is under a residual stress.

Figure 21:
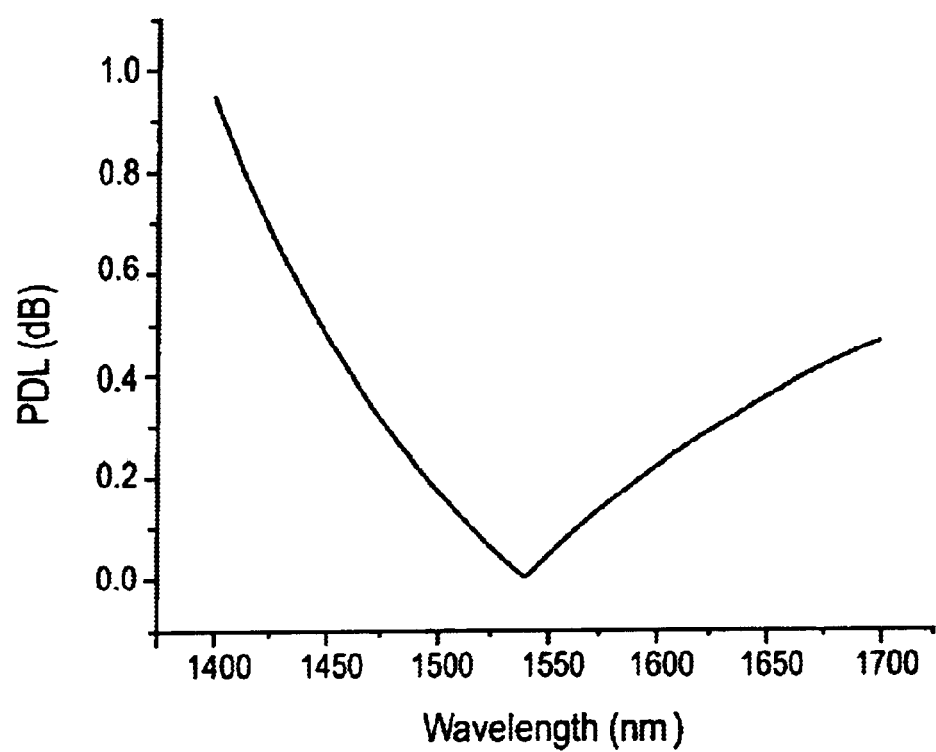
FIG. 21 is a graph which illustrates PDL of the fiber used in a filter such as the filter of FIG. 7 against notch wavelength.

FIG. 21 illustrates PDL of the fiber when used in a filter such as in FIG. 7. The fiber is optimized so that PDL is zero at a notch wavelength of approximately 1540 nm. In another embodiment, the fiber may be optimized so that PDL is a minimum at other wavelengths, in particular between 1250 nm and 1650 nm. An increase of the notch wavelength above 1540 nm increases PDL, and a decrease in the notch wavelength below 1540 nm also increases PDL. PDL is below 0.5 dB at all notch wavelengths between 1450 nm and 1650 nm. The PDL of FIG. 21 was obtained under the following conditions:

Interaction length: 10 cm;
Acoustic wave: flexural wave with a linear vibration direction;
Notch depth: 10 dB; and
3 dB notch width: 4.5 nm.

Figure 22:
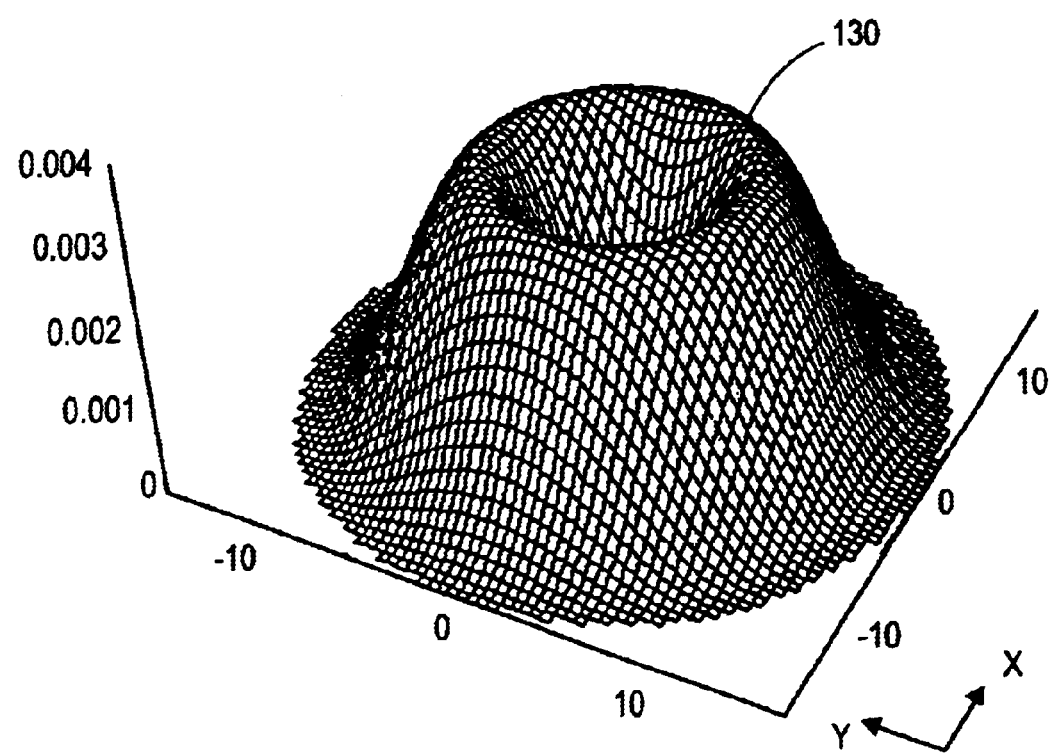
FIG. 22 is a two-dimensional view illustrating intensity of a first-order mode of light propagating through the cladding.
Figure 23:
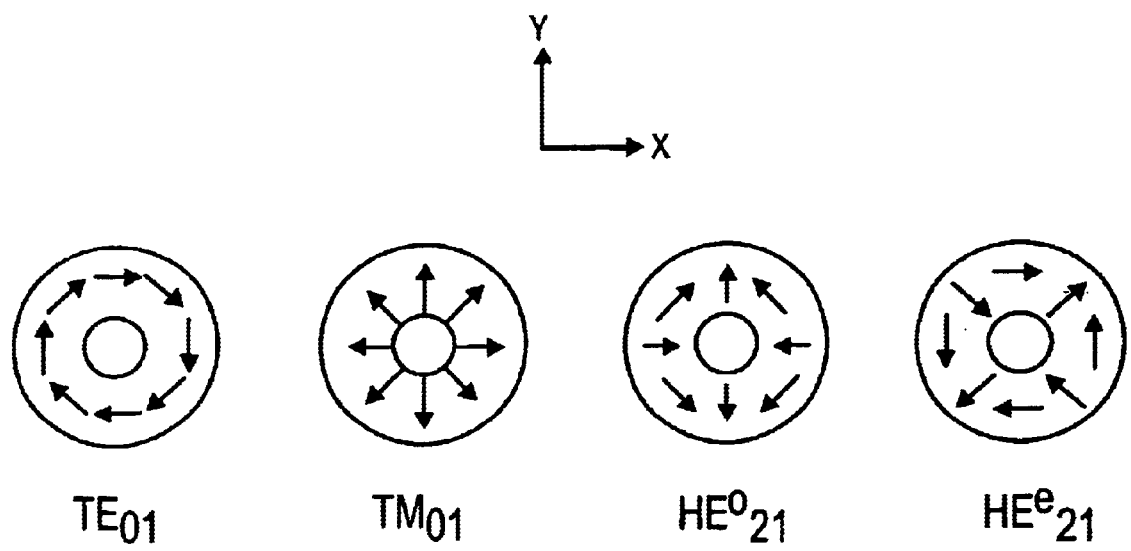
FIG. 23 illustrates eigenmodes of the first-order mode group of FIG. 22.

It may also be possible to match speeds of eigenmodes of other orders of light propagating through the cladding. FIG. 22 illustrates an intensity profile of a first-order mode of light propagating in the cladding. The first-order mode has an intensity profile having a single circular peak 130. FIG. 23 illustrates the eigenmodes in the first-order mode group illustrated in FIG. 22. The eigenmodes include $TE_{01}$, $TM_{01}$, $HE^o_{21}$, and $HE^e_{21}$. The fractional speed difference between $TE_{01}$ and $TM_{01}$ may be reduced in order to reduce PDL in a filter with linear vibration of the fiber.

Figure 24:
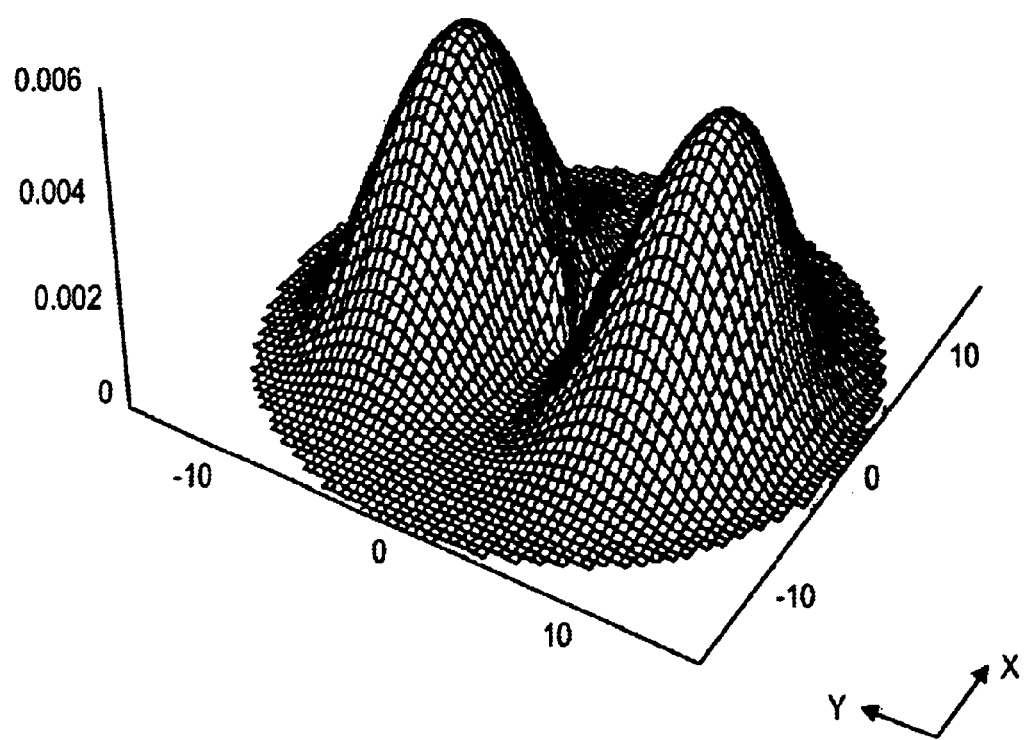
FIG. 24 is a three-dimensional view of a first-order mode group of light in a cladding of an elliptical fiber.
Figure 25:
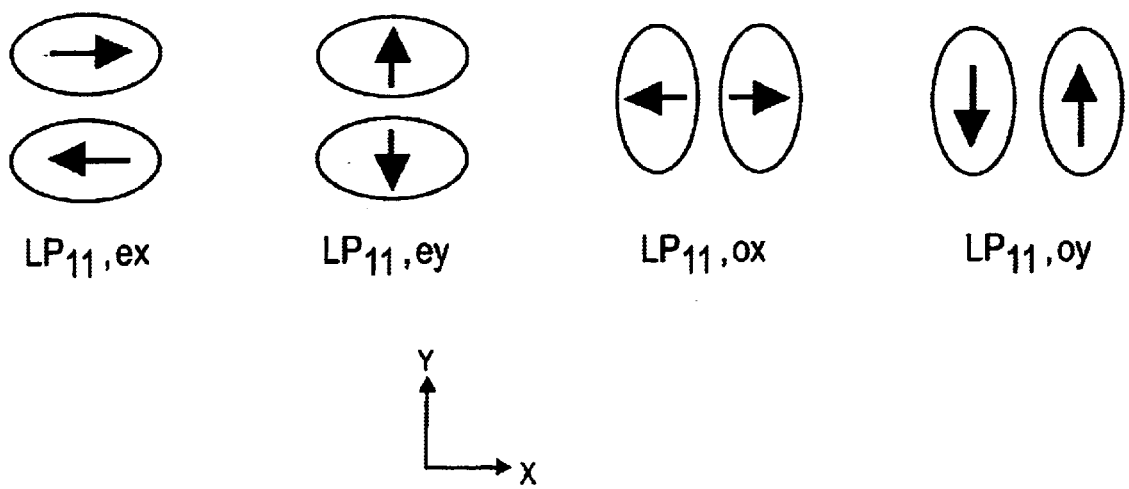
FIG. 25 illustrates electric-field components of four eigenmodes of the mode group shown in FIG. 24.

Desired performance may also be obtained with fibers other than circular fibers. FIG. 24 illustrates an intensity profile of a first-order mode of light in a cladding of an elliptical fiber. FIG. 25 illustrates the electrical-field components of four eigenmodes of the first-order mode group of FIG. 24. Polarization dependence and PDL may be reduced by minimizing fractional speed differences between two of the eigenmodes illustrated in FIG. 25.

Low polarization-dependent fiber may also be achieved without matching speeds of eigenmodes in a mode group. Low polarization dependence can, for example, be achieved by making speed differences between eigenmodes the same in two mode groups. For example, the speed difference between LP01x and LP01y can be made to be the same as that between the LP11x even and LP11y even. This can be achieved by optimizing the index and stress profiles of a fiber and the ellipticity of the core or cladding.

One can also do post-trimming on a fiber to match the speed difference by using the birefringence creation and/or symmetric stress change by UV light, as will now be illustrated.

Figure 26:
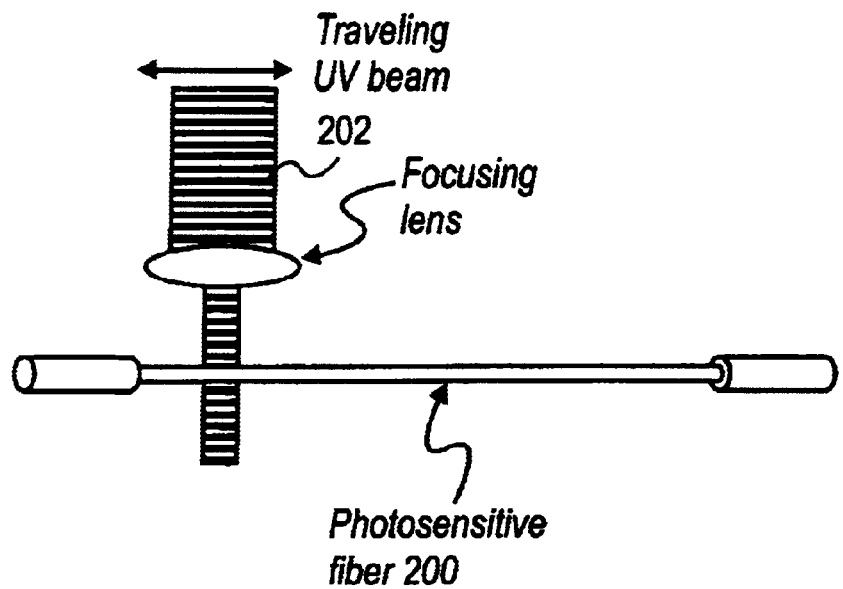
FIG. 26 is a side view illustrating how polarization dependence can be changed by modifying birefringence utilizing an ultraviolet (UV) beam.

In FIG. 26, a photosensitive single-mode optical fiber 200 is exposed to a focused UV light 202 which travels along the axis of the fiber 200 over a predetermined length at a controlled speed. The photosensitive fiber is made by creating an oxygen-deficient bonding either through Ge, Sn, or B doping in the core or a hydrogen loading of a standard single-mode fiber. Preferably, the wavelength of UV light is 242–266 nm by using an Excimer laser or a frequency-doubled Ar+ laser. The energy of UV light is between 0.1–1 J/cm$^2$. The polarization of the UV light is s-pol, aligned orthogonal to the axial axis of the fiber in order to enhance the index anisotropy for a given UV exposure. An index anisotropy as large as $\Delta n > 1 \times 10^{-5}$ is possible in the core, which is 0.1~10% of the change of the average refractive index. Since the index anisotropy is localized in the core, the cladding mode experiences much less birefringence than the core mode.

Figure 27:
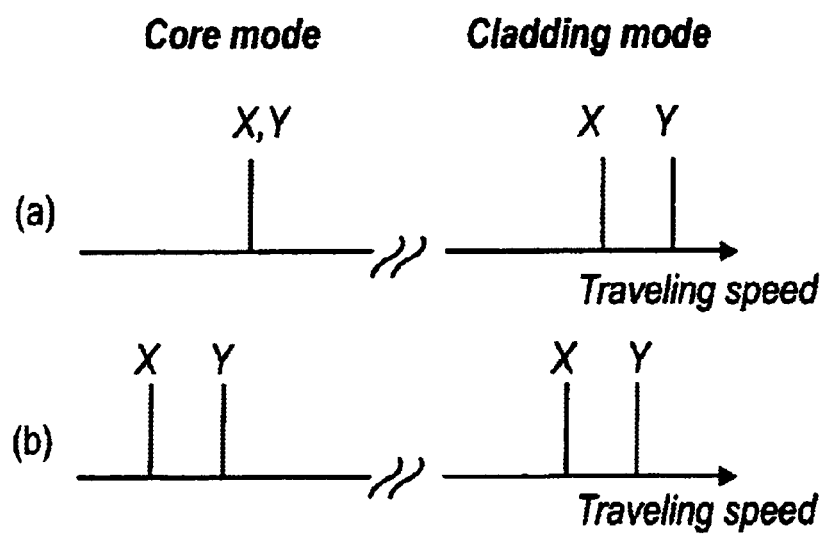
FIGS. 27(a) and 27(b) are graphs illustrating modification of propagation speeds of eigenmodes due to the UV beam.

FIG. 27 illustrates this technique. Suppose the original fiber has nominally zero birefringence in the core mode and non-zero birefringence in the cladding mode, as shown in FIG. 27. This causes polarization dependence in coupling between the two modes. The UV exposure creates birefringence in the core just enough to make the splitting in the core mode to be equal to that in the cladding mode. Therefore, the polarization dependence in mode coupling between the core and cladding modes becomes reduced. This is illustrated in FIG. 27. By this means, the polarization-dependent loss (PDL) of an acousto-optic filter can be reduced to less than 0.5 dB at 4 nm width and 10 dB depth notch.

Ideally, traveling speeds satisfy the following equation:

$$|A-B| < 5 \times 10^{-7} \quad (4)$$

where A is the fractional speed difference between LP01x and LP01y (i.e., A=(speed of LP01x−speed of LP01y)/speed of LP01x) in the core and B is the fractional speed difference between LP11x and LP11y (i.e., B=(speed of LP11x−speed of LP11y)/speed of LP11x) in the cladding. In the case of a fiber having a circular core, such as in FIG. 16, A is approximately zero, so that the result of the equation |A−B| is the same as |B|. According to eq(2), $|B| < 5 \times 10^{-7}$, so that |A−B| is also smaller than $5 \times 10^{-7}$.

It is also known that UV exposure (un-polarized light) changes the (symmetric) residual stress of an optical fiber. This property can also be used in fine-tuning the splitting in the cladding mode so as to reduce the polarization dependence in the mode coupling between the core and the cladding modes.

While certain exemplary embodiments have been described and shown in the accompanying drawings, it is to be understood that such embodiments are merely illustrative and not restrictive of the current invention, and that this invention is not restricted to the specific constructions and arrangements shown and described, since modifications may occur to those ordinarily skilled in the art.

What is claimed is:

1. An optical fiber comprising:

a core;

a cladding over the core, light propagating through the cladding having a first selected mode group having a first eigenmode propagating at a first speed and a second eigenmode propagating at a second speed, wherein:

|first speed−second speed|/first speed$<5 \times 10^{-7}$.

2. The optical fiber of claim 1 wherein the first selected mode group is not a first-order mode group.

3. The optical fiber of claim 2 wherein the first selected mode group is a second-order mode group.

4. The optical fiber of claim 1 wherein the first selected mode group has a third eigenmode propagating at a third speed, wherein:

|first speed−third speed|/first speed$<5 \times 10^{-7}$.

5. The optical fiber of claim 1 wherein the first and second eigenmodes are TE and TM respectively.

6. The optical fiber of claim 1 wherein the cladding includes an inner cladding and an outer cladding, an axial stress in the inner cladding being different than in the outer cladding.

7. The optical fiber of claim 6 wherein the inner cladding is under an axial compressive stress.

8. The optical fiber of claim 7 wherein the axial stress levels in the core and the outer cladding are higher than in the inner cladding.

9. The optical fiber of claim 8 wherein the core has a higher refractive index than the cladding.

10. The optical fiber of claim 1 wherein the core is a single-mode core.

11. The optical fiber of claim 1 wherein the light has a wavelength between 1250 nm and 1650 nm.

12. The optical fiber of claim 1 wherein the light has a wavelength of approximately 1540 nm.

13. An optical fiber comprising:

a core; and a cladding over the core wherein, if first and second portions of the fiber are secured to first and second mounts of a support structure respectively so that an interaction length of 10 cm is defined between the portions, light propagates through the core, and an end of the interaction length is vibrated at a selected frequency to produce a notch with a 10 dB depth and a 4 nm width, a wavelength of the light couples into the cladding and PDL of the wavelength in the cladding is less than 0.5 dB.

14. The optical fiber of claim 13 wherein at least a 3 dB notch is created in the light in the core at the wavelength.

15. The optical fiber of claim 13 wherein the wavelength is between 1250 nm and 1650 nm.

16. The optical fiber of claim 13 wherein an increase in frequency of the vibration causes an increase in the PDL and a decrease in the frequency of the vibration causes an increase in the PDL.

17. An optical fiber, comprising:
a core; and
a cladding over the core wherein:

$$\left| \int_0^{2\pi} \int_0^R (|E_{TM_{0m}}|^2 n_{r\,stress} - |E_{TE_{0m}}|^2 n_{\theta\,stress}) r d\,r d\,\theta - (n_{TM_{0m}\,no\,stress}^{eff} - n_{TM_{0m}\,no\,stress}^{eff}) \right| < 5 \times 10^{-7}$$

where:
R is an outer radius of the cladding;
$E_{TM_{0m}}$ is an electric field of an m-th order of a transverse-magnetic mode, designated the $TM_{0m}$ mode;
$E_{TE_{0m}}$ is an electric field of an m-th order of a transverse-electric mode, designated the $TE_{0m}$ mode;
r is a radius of a location from a center point of the core;
θ is an angle between a reference line from the center point and a line from the center point to the location;
$n_{TM_{0m}\,no\,stress}^{eff}$ is an effective refractive index of the $TM_{0m}$ mode, calculated by an optical waveguide theory when the fiber is under no residual stress;
$n_{TE_{0m}\,no\,stress}^{eff}$ is an effective refractive index of the $TE_0m$ mode, calculated by an optical waveguide theory when the fiber is under no residual stress;
$n_{r\,stress}(r,\theta)$ is a refractive index as perceived by an electric field polarized in a radial direction at a location (r,θ) when the location is under a residual stress;
$n_{74\,stress}(r,\theta)$ is a refractive index as perceived by an electric field polarized in a circumferential direction at a location (r,θ) when the location is under a residual stress.

18. The optical fiber of claim 17 wherein the cladding has an inner portion and an outer portion, an axial stress in the inner portion being different than in the outer portion.

19. The optical fiber of claim 18 wherein the inner portion is under an axial compressive stress.

20. The optical fiber of claim 19 wherein the core is under an axial tensile stress.

21. The optical fiber of claim 20, wherein the core has a higher refractive index than the cladding.

22. The optical fiber of claim 17 wherein the cladding surrounds the core.

23. An optical fiber, comprising:
a core, light propagating through the core having a first core selected mode group with a first core eigenmode traveling at a first core speed and a second core eigenmode traveling at a second core speed; and
a cladding over the core, light propagating through the cladding having a first cladding mode selected group with a first cladding eigenmode traveling at a first cladding speed and a second cladding eigenmode traveling at a second cladding speed, wherein:

|(first core speed−second core speed)/first core speed−(first cladding speed−second cladding speed)/first cladding speed|<5×10⁻⁷.

24. The optical fiber of claim 23 wherein the first and second core eigenmodes and the first and second cladding eigenmodes are LP01x, LP01y, LP11x, and LP11y, respectively.

* * * * *